(12) United States Patent
Newton et al.

(10) Patent No.: US 10,023,010 B2
(45) Date of Patent: Jul. 17, 2018

(54) MICRO-ELECTROMECHANICAL SYSTEM FOR USE IN VEHICLE DOORS TO INCREASE SOUND QUALITY VEHICLE PERFORMANCE OF THE VEHICLE DOORS

(71) Applicant: Ford Global Technologies, LLC, Dearborn, MI (US)

(72) Inventors: Richard E. Newton, White Lake, MI (US); Jim Antime Marleau, Jr., Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/377,150

(22) Filed: Dec. 13, 2016

(65) Prior Publication Data

US 2018/0162272 A1    Jun. 14, 2018

(51) Int. Cl.
*G10K 11/16* (2006.01)
*B60C 9/00* (2006.01)
*B60R 16/00* (2006.01)
*G10K 11/178* (2006.01)

(52) U.S. Cl.
CPC .............. *B60C 9/00* (2013.01); *B60R 16/005* (2013.01); *G10K 11/178* (2013.01); *G10K 11/1788* (2013.01); *B60Y 2306/09* (2013.01); *B60Y 2306/11* (2013.01); *B60Y 2400/304* (2013.01); *G10K 2210/1282* (2013.01)

(58) Field of Classification Search
CPC .... B60Q 9/00; B60R 16/005; G10K 11/1788; G10K 2210/1282; B60Y 2306/09; B60Y 2306/11; B60Y 2400/304

USPC ........ 381/71.1, 71.4, 73.1, 86, 302; 701/49, 701/301; 296/146.1, 146.2, 147; 340/435, 436, 438
See application file for complete search history.

(56) References Cited

U.S. PATENT DOCUMENTS

| | | | | |
|---|---|---|---|---|
| 5,072,965 | A | * | 12/1991 | Wada ................... B60G 17/017 280/124.101 |
| 6,135,541 | A | | 10/2000 | Geise et al. |
| 7,106,868 | B2 | | 9/2006 | Daly |
| 7,193,509 | B2 | | 3/2007 | Bartels et al. |
| 8,280,593 | B2 | | 10/2012 | Nakakura et al. |
| 2004/0056652 | A1 | * | 3/2004 | Bomya ............... B60R 21/0136 324/207.17 |
| 2007/0188168 | A1 | * | 8/2007 | Stanley ............... B60R 21/0136 324/228 |

(Continued)

FOREIGN PATENT DOCUMENTS

| | | |
|---|---|---|
| CN | 103568998 | 2/2014 |
| FR | 2940835 A1 * | 7/2010 |
| JP | 2011207251 | 10/2011 |

*Primary Examiner* — Xu Mei
*Assistant Examiner* — Friedrich W Fahnert
(74) *Attorney, Agent, or Firm* — Jason Rogers; Price Heneveld LLP (57) ABSTRACT

A vehicle includes a three-axis accelerometer attached to a door and in communication with a processor. A speaker is in communication with the processor. Operation of the door toward a closed position is measured by the accelerometer to define a corresponding door acceleration. The processor determines a corresponding door-operating event based on the corresponding door acceleration and the speaker delivers a corresponding audio signal in response to the corresponding door-operating event.

19 Claims, 7 Drawing Sheets

(56) References Cited

U.S. PATENT DOCUMENTS

| | | | | |
|---|---|---|---|---|
| 2008/0046153 A1* | 2/2008 | Oualkadi | ................ | E05F 15/41 |
| | | | | 701/49 |
| 2010/0217491 A1* | 8/2010 | Naito | ........................ | B60C 3/06 |
| | | | | 701/49 |
| 2014/0077943 A1* | 3/2014 | Bloukos | ................... | B60Q 9/00 |
| | | | | 340/457 |
| 2017/0030126 A1* | 2/2017 | Elie | ........................ | E05F 15/614 |
| 2017/0050558 A1* | 2/2017 | Salter | ........................ | B60R 1/12 |

* cited by examiner

MICRO-ELECTROMECHANICAL SYSTEM FOR USE IN VEHICLE DOORS TO INCREASE SOUND QUALITY VEHICLE PERFORMANCE OF THE VEHICLE DOORS

FIELD OF THE INVENTION

The present invention generally relates to vehicle doors, and more specifically, a micro-electromechanical system incorporated within a vehicle door to measure, in at least three axes, movements of the vehicle door.

BACKGROUND OF THE INVENTION

During operation of typical vehicle doors, closure of the vehicle door can result in various frequencies of noise. Certain frequencies of noise are undesirable and can be uncomfortable to users of the vehicle. These undesirable noises can be generated by vibrations within the material of the door, engagements of different materials during closure of the door, and misalignment of a door in relation to the vehicle frame.

SUMMARY OF THE INVENTION

According to one aspect of the present invention, a vehicle includes a micro-electromechanical sensor attached to a door and in communication with a processor. A speaker is in communication with the processor. Operation of the door toward a closed position is measured by the sensor to define a corresponding door movement. The processor determines a corresponding door-operating event based on the corresponding door movement and the speaker delivers a corresponding audio signal in response to the corresponding door-operating event.

According to another aspect of the present invention, a method for operating a speaker for a vehicle includes positioning a micro-electromechanical sensor on a portion of a door of the vehicle. The door is operated from an open position toward a closed position. A rotational movement of the door is measured, wherein the micro-electromechanical sensor measures the rotational movement. The rotational movement of the door is communicated to a processor. A door-operating event is determined, wherein the processor uses the door movement to determine at least one of a door position, a rotational speed of the door, a vertical deflection of the door and a target resonance of the door. A corresponding audio response is determined, wherein the processor evaluates the door-operating event and communicates the corresponding audio response to a speaker disposed within or proximate the door. The corresponding audio response is delivered, wherein the speaker emits an audio signal that is indicative of the corresponding audio response.

According to another aspect of the present invention, a method for operating a speaker for a vehicle includes positioning a micro-electromechanical sensor on a vehicle door. A rotational acceleration of the door is measured as the door moves into a closed position. The rotational acceleration of the door is communicated to a processor. A door-operating event is determined based upon the door acceleration. A corresponding audio response is determined based upon the door-operating event. The corresponding audio response is delivered to a speaker, wherein the speaker emits an audio signal indicative of the corresponding audio response.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
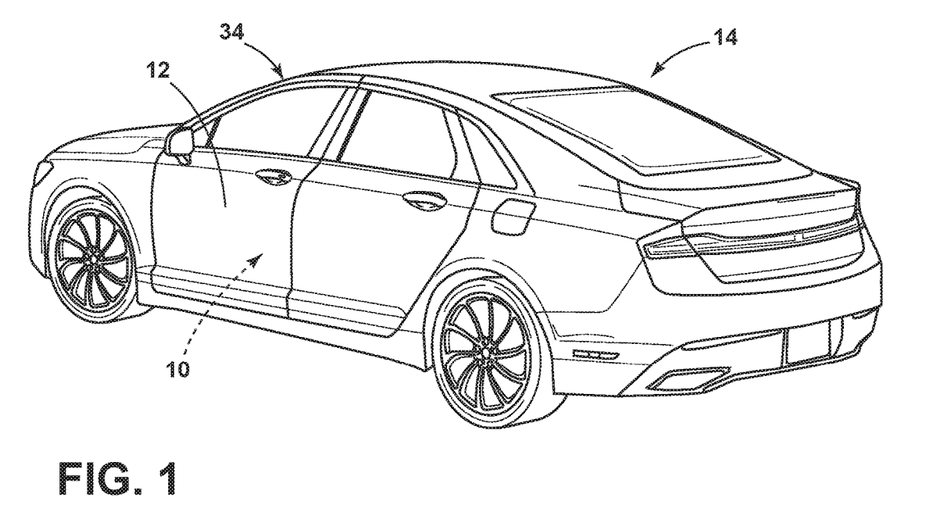
FIG. 1 is a side perspective view of a vehicle incorporating an aspect of the micro-electromechanical system and showing the vehicle doors in a closed position.
Figure 2:
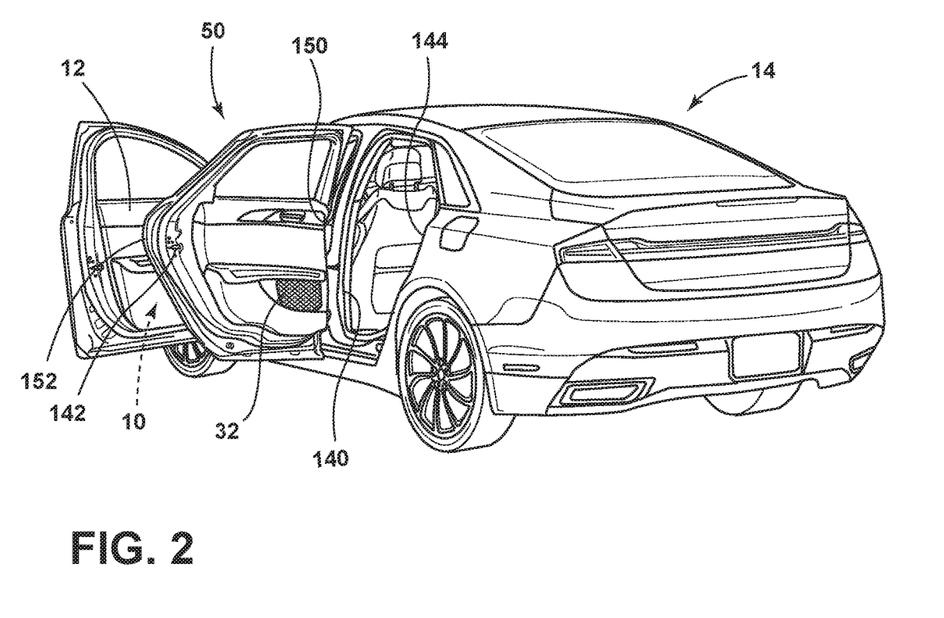
FIG. 2 is a side perspective view of the vehicle of FIG. 1 showing the doors in the open position.
Figure 3:
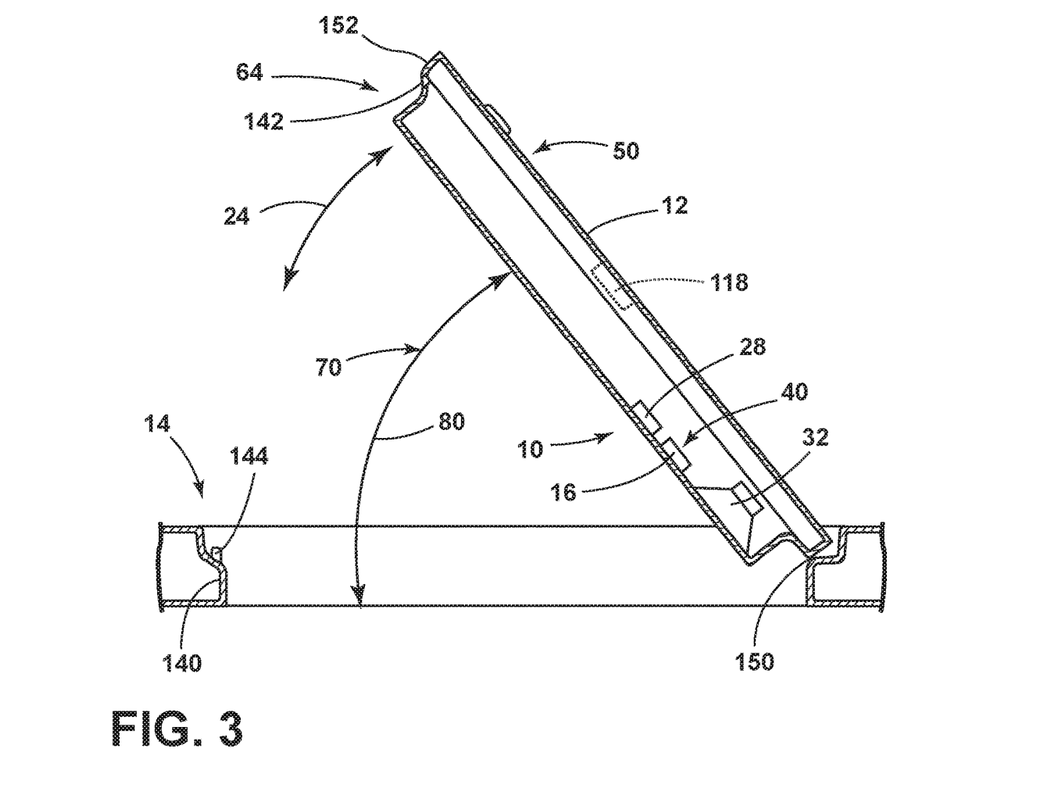
FIG. 3 is cross-sectional view of the vehicle of FIG. 2 taken along line III-III and showing the door in an open position.
Figure 4:
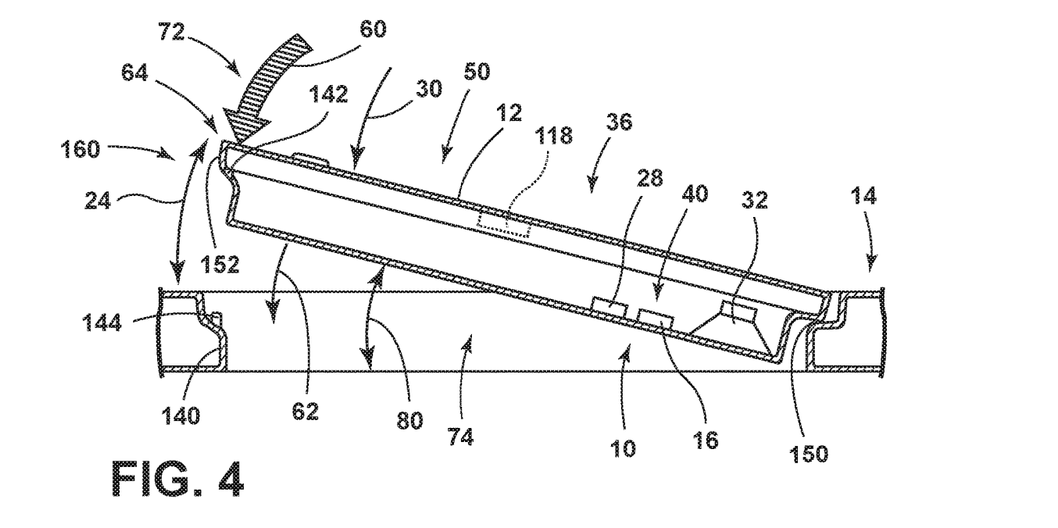
FIG. 4 is a cross-sectional view of the vehicle door of FIG. 3 and showing the vehicle door moving toward the closed position.
Figure 5:
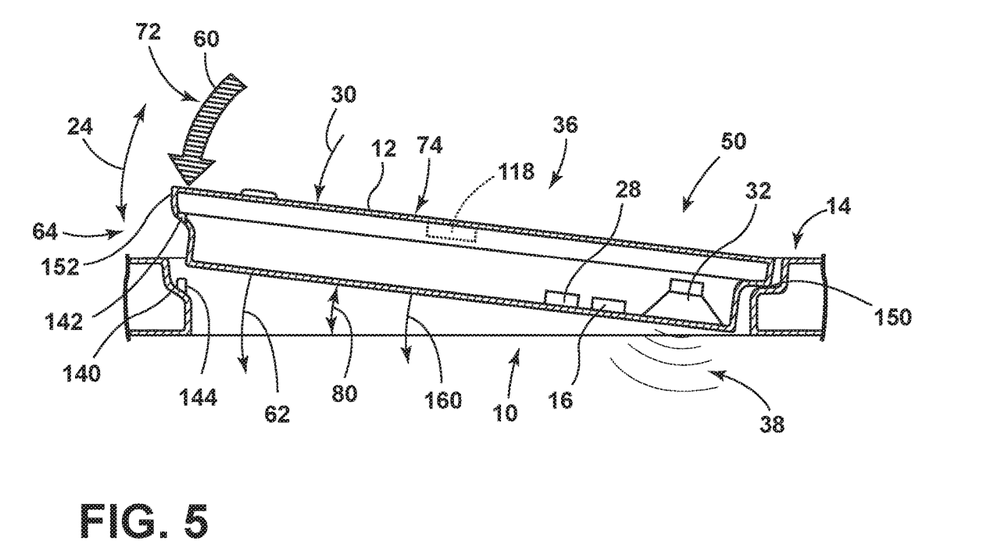
FIG. 5 is a cross-sectional view of the vehicle door of FIG. 4 showing the vehicle door about to enter the closed position.
Figure 6:
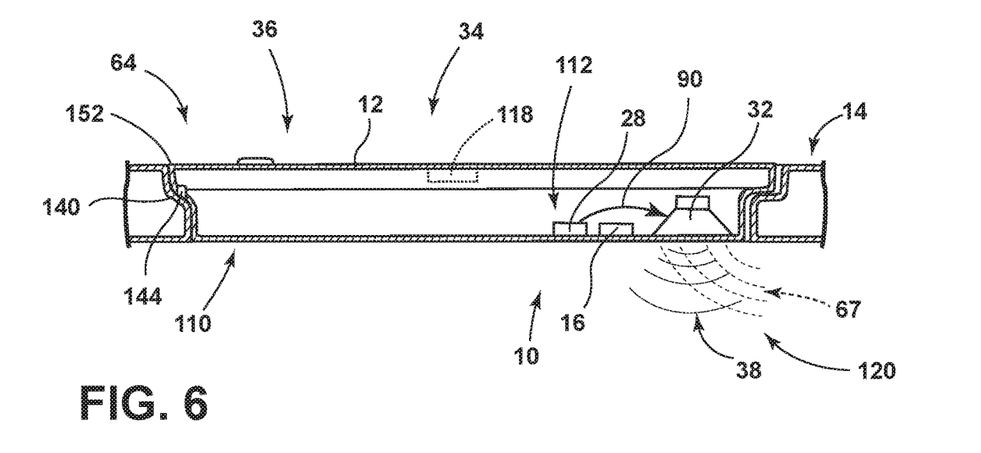
FIG. 6 is a cross-sectional view of the vehicle of FIG. 1 taken along line VI-VI.
Figure 7:
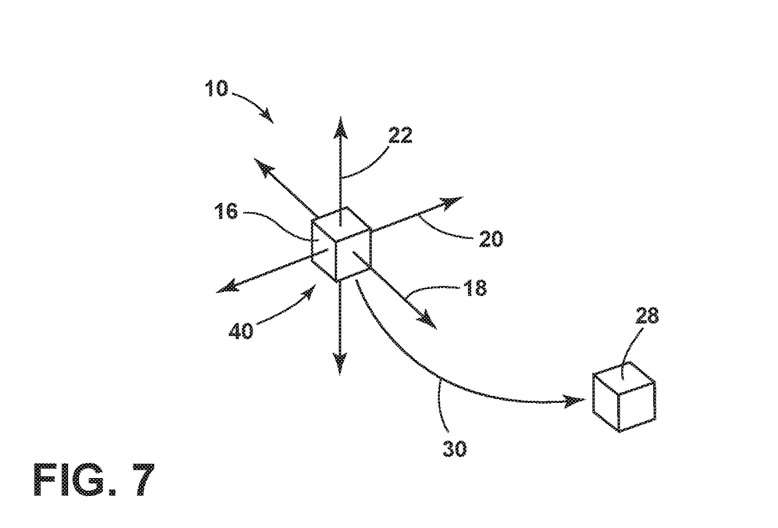
FIG. 7 is a schematic perspective view of a micro-electromechanical sensor in the form of a three-axis accelerometer.
Figure 8:
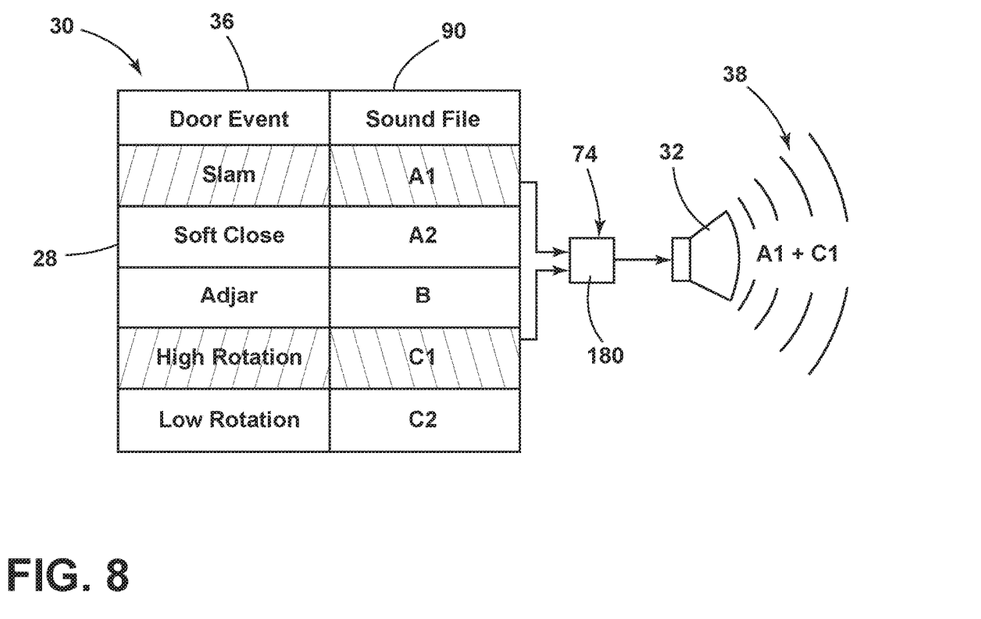
FIG. 8 is a schematic diagram illustrating an aspect of the method for operating a speaker using the micro-electromechanical system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-8, reference numeral 10 generally refers to a micro-electromechanical system incorporated within a door 12 of a vehicle 14 that is used for measuring various movements of the door 12 during operation of the vehicle 14. Typically, the micro-electromechanical system 10 can include various micro-electromechanical sensors 40. Such sensors 40 can include, but are not limited to, accelerometers 16, speed sensors, angular rate sensors, combinations thereof, and other similar sensors 40. In various embodiments, where an accelerometer 16 is included, the accelerometer 16 can be a three-axis accelerometer 16 that can measure movements along lateral x- and y-axis 18, 20 and a vertical z-axis 22. The x-, y- and z-axes 18, 20, 22 of the three-axis accelerometer 16 can be used to measure rotational movement 24 of the door 12 of the vehicle 14 as well as vertical displacement 26 of the door 12 during use. While a three-axis accelerometer 16 is described above, an accelerometer 16 having a single axis of measurement or two axes of measurement may be implemented as well.

According to the various embodiments, as exemplified in FIGS. 1-8, the vehicle 14 can include the micro-electromechanical sensor 40 that is attached to a door 12 of a vehicle 14. The sensor 40 is placed in communication with a processor 28. Typically, the processor 28 receives measurements related to the rotational movement 24 of the door 12. Such movements can include door acceleration 30, rotational movement 24, velocity 62 of the door 12, and other similar movements, as will be described more fully below. The processor 28 performs various mathematical computations and algorithms incorporating the door movement 24 to output door acceleration 30, force 60, velocity 62 and positional information regarding the door 12 of the vehicle 14. A speaker 32 can be disposed within or proximate the door 12 of the vehicle 14 and is placed in communication with the processor 28. Operation of the door 12 toward a closed position 34 is measured by the sensor 40, such as an accelerometer 16 or an angular rate sensor to define a corresponding door movement 24. The processor 28 determines a corresponding door-operating event 36 based upon the corresponding door movement 24. The speaker 32 then delivers a corresponding audio signal 38 in response to the corresponding door-operating event 36. It is contemplated that the speaker 32 can be placed in communication with the processor 28. Accordingly, the door-operating event 36 corresponds to a particular corresponding audio signal 38 that is communicated to the speaker 32 from the processor 28, and then emitted by the speaker 32. The nature of the audio signal 38 will be discussed more fully below.

Referring again to FIGS. 1-8, it is contemplated that the micro-electromechanical sensor 40 can be in the form of an accelerometer 16, angular rate sensor, or other similar motion-measuring sensor. The micro-electromechanical sensor 40 is configured to measure movements of the door 12 of the vehicle 14 without the need for a corresponding contact or matching sensor to measure against. Rather, the micro-electromechanical sensor 40 measures a door movement 24 of the door 12 of the vehicle 14 as the door 12 moves between the open and closed positions 50, 34. In this manner, the micro-electromechanical sensor 40 is a single sensor that can measure door movement 24. As discussed herein, the door movement 24 can include, but is not limited to, door acceleration 30, door rotation, door position, door vibration, and other movements related to the door 12 of the vehicle 14. By way of example, and not limitation, the micro-electromechanical sensor 40 can be in the form of a three-axis accelerometer 16 that is positioned within the interior cavity of the door 12. The micro-electromechanical sensor 40 provides door acceleration 30 measurements along the three axes. Again, the inclusion of the x-, y- and z-axes 18, 20, 22 of the micro-electromechanical sensor 40 allow for the determination of angular velocity 62 measures of the door 12. The processor 28 can perform various mathematical computations based upon the door movement 24, where such mathematical computations can include derivatives and function equations to determine door acceleration 30, force 60, velocity 62, and position 64 of the door 12 at any particular time and/or rotational position as the door 12 moves between the open and closed positions 50, 34. The door acceleration 30, force 60, velocity 62 and/or position of the door 12, or combinations thereof, can be combined to determine the particular door-operating event 36. The particular door-operating event 36 is then communicated by the processor 28 to the speaker 32 that results in a corresponding audio signal 38 to be emitted by the speaker 32. As discussed herein, while a three-axis accelerometer 16 is discussed, the micro-electromechanical sensor 40 can take the form of any one or more sensors. Such sensors can include, but are not limited to accelerometers 16, speed sensors, angular rate sensors, combinations thereof, and other similar sensors.

Referring again to FIGS. 1-8, by way of example, and not limitation, the audio signal 38 can be in the form of a door closing sound that enhances the sound of the closure of the door 12 of the vehicle 14. This enhancement of the sound of the door 12 can be used to drown out various unwanted noises 67, such as high-frequency noises. Such high-frequency noises can be in the form of ringing, scratching, high-frequency resonations, and other similar unwanted noises 67. Similarly, lower-frequency noises can also be undesirable and can be drowned out through use of the audio signal 38 defined by the door-operating event 36 communicated by the processor 28 to the speaker 32.

Referring again to FIGS. 1-8, by way of example, and not limitation, the door-operating event 36 can be in the form of a high rotation 70 and high velocity closure or "slam" 74 of the door 12 of the vehicle 14. The micro-electromechanical system 10 can record the high velocity 72 of rotational movement 24 of the door 12 toward the closed position 34. This door movement 24 can be used to determine, mathematically, the acceleration 30, velocity 62 and/or rotational position 64 of the door 12 as it nears the closed position 34. In order to properly time the transmission of the corresponding audio signal 38 with the rotational movement 24 of the door 12 into the closed position 34, the audio signal 38 is emitted before the door 12 actually reaches the closed position 34. The high velocity 72 of the door 12 based upon "slam" 74 type door-operating event 36 indicates that the audio signal 38 will be emitted when the door 12 is a particular angular distance 80 away from the closed position 34. When the door 12 reaches this angular distance 80 relative to the closed position 34, the audio signal 38, as determined by the door-operating event 36, is emitted by the speaker 32 to drown out unwanted noise 67 and provide a more pleasing sound of the vehicle door 12 upon closure. Again, the timing of the audio signal 38 is based upon the door acceleration 30 measured and/or recorded by the micro-electromechanical sensor 40 and further determined by the mathematical computations conducted by the processor 28. Conversely, where the door-operating event 36 involves a slower rotation and slower velocity 62, the micro-electromechanical sensor 40 may record slower acceleration of the door 12 towards the closed position 34. This slower rotational movement 24 as measured by the micro-electromechanical sensor 40 is communicated to the processor 28 to perform the various mathematical computations to derive the force 60, velocity 62, and/or position 64 of the vehicle door 12. Due to this slower rotation of the vehicle door 12, the timing of the transmission of the audio signal 38 will likely be different from that of the "slam" 74 event described above.

Referring again to FIGS. 1-8, it is contemplated that the various door-operating events 36 can correspond to different pre-recorded audio files 90 that can be delivered, and transmitted by, the speaker 32 as necessary based upon the occurrence of a particular door-operating event 36. As discussed above, a "slam" 74 type door-operating event 36 and a slow closure of the door 12 result in a different timing of the transmission of the audio signal 38 from the speaker 32. Additionally, the pre-recorded audio file 90 emitted by the speaker 32 can vary, depending upon the determination of the corresponding door-operating event 36. By way of example, and not limitation, a higher door acceleration 30 of the door 12 to the closed position 34 can result in a speaker 32 emitting a particular audio signal 38 having a higher volume. Conversely, a slow closure of the door 12 can result in the speaker 32 emitting a different audio signal 38 that may have a lower volume and a different amplitude and frequency signature than that of the "slam" 74 event. Various audio files 90 can be pre-recorded to account for various door-operating events 36. These door-operating events 36 can vary, based upon the amount of angular rotation or rotational movement 24 required to move the door 12 to the closed position 34, the force 60 applied to the door 12 in moving the door 12 to the closed position 34, the condition of the other doors 12 of the vehicle 14 relative to the open and closed positions 50, 34, the position 64 of various occupants within the vehicle 14 and outside the vehicle 14, combinations thereof and other similar factors relating to the operation of the doors 12 of the vehicle 14 and the sound emanating from the doors 12 as well as the speaker 32 disposed within the door 12.

According to the various embodiments, the pre-recorded audio file 90 emitted by the speaker 32 based upon the door-operating event 36 can be indicative of a door-closing sound that may be more pleasing to the ear than the actual sound of the door 12 being moved to the closed position 34. Additionally, the pre-recorded audio file 90 can include sounds other than a door closure sound. Such sounds can include audio files 90 indicating various status information or warnings. Such information communicated to the speaker 32 can be in the form of a door ajar signal, the presence of an object closed within a door 12 (clothing, seat belt, etc.), various calibration signals 100 (as will be described more fully below), customizable sound files, combinations thereof and other similar auditory signals.

Referring now to FIGS. 1-10, the micro-electromechanical sensor 40 of the micro-electromechanical system 10 can also be used for noise cancelling functions. In such an embodiment, the micro-electromechanical sensor 40 can detect various door noise signatures 110 emanating from portions of the door 12. These door noise signatures 110 can be compared with acceptable noise signatures 112 where the acceptable noise signatures 112 can be preset or predesignated sound ranges that correspond to more pleasing auditory sounds delivered to the occupants of the vehicle 14. Where the door noise signature 110 emanating from the door 12 lies outside the acceptable noise signature 112, the speaker 32, or other similar device, such as a solenoid 118 or driver, can be mounted within the door 12 to emit various noise canceling signals 120. These noise canceling signals 120 are typically 180° out of phase with the audio signature of the unwanted noise 67 being canceled. Typically, the audio signature being canceled is that part of the door noise signature 110, such as the unwanted noise 67, that falls outside of the acceptable noise signatures 112.

Figure 9:
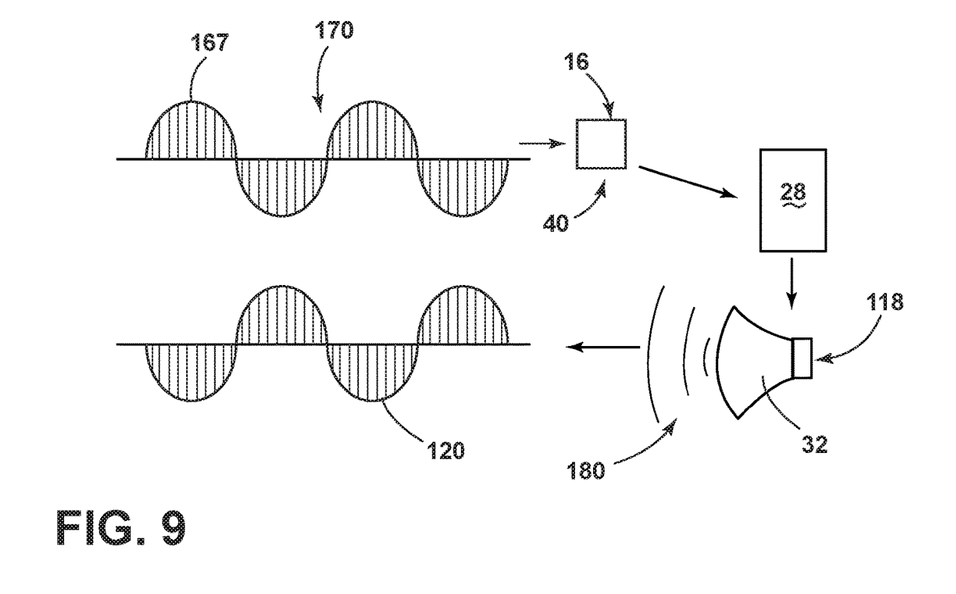
FIG. 9 is a schematic diagram illustrating an aspect of the micro-electromechanical system used to provide noise-cancelling functionality to the operation of the vehicle door.
Figure 10:
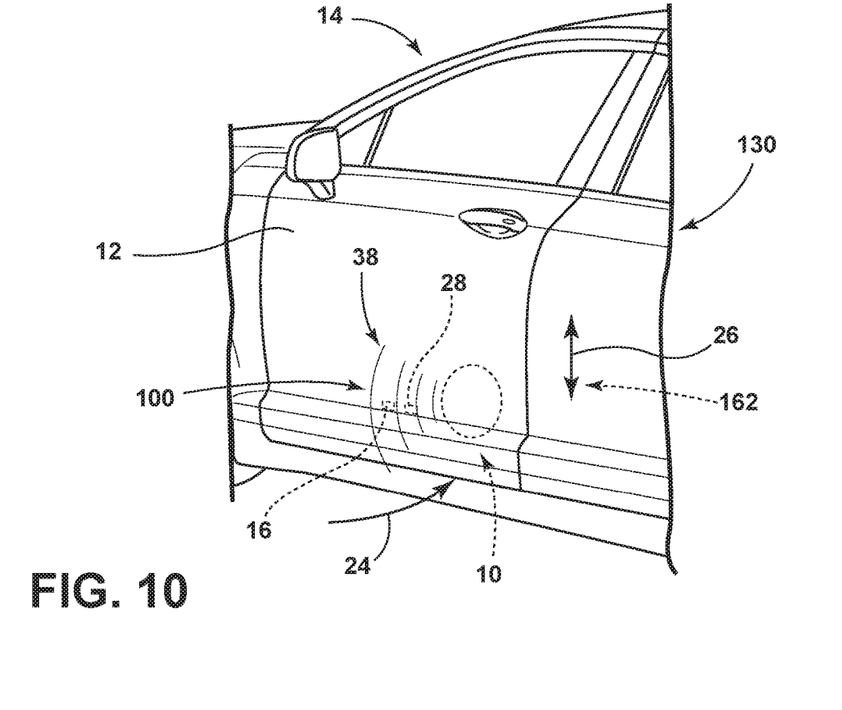
FIG. 10 is a schematic perspective view of a vehicle door incorporating an aspect of the micro-electromechanical system and shown in a maintenance state for calibrating a position of a vehicle door.

Referring now to FIG. 9, the schematic illustrated in FIG. 9 exemplifies an aspect of the noise canceling function of the micro-electromechanical sensor 40. Frequencies, such as door noise signatures 110, delivered to and measured by the micro-electromechanical sensor 40 are transmitted to the processor 28, where the processor 28 evaluates the nature of the door noise signature 110 from the vehicle door 12. Where the door noise signature 110 lies outside of the acceptable frequency signature, the processor 28 delivers to the speaker 32 or other noise canceling device, the noise canceling signal 120. The noise canceling signal 120 is then transmitted from the speaker 32 and/or the solenoid 118 to cancel out the portion of the door noise signature 110 that lies outside of the acceptable noise signature 112. In this manner, the processor 28 can determine the appropriate frequency to be transmitted by the speaker 32 and/or the solenoid 118 as the processor 28 receives the incoming door noise signature 110 from the micro-electromechanical sensor 40. Such noises being canceled can be similar to the unwanted noises 67 described above. These unwanted noises 67 can include certain high frequency noises and low frequency noises that are outside of ranges that are typically acceptable or pleasing to an occupant's ear.

According to various embodiments, a pre-recorded audio file 90 can be emitted by the speaker 32 and/or the noise canceling functions of the micro-electromechanical system 10 can cancel out frequencies of unwanted noise 67. It is contemplated that the noise canceling signal 120 can be used individually or in conjunction with the pre-recorded audio file 90 to provide a more pleasing quality of sound as the door 12 is moved into the closed position 34.

Referring again to FIGS. 1-9, where the audio signal 38 is a noise canceling signal 120, the noise canceling signal 120 is typically inversely defined by the corresponding door-operating event 36. In such an embodiment, the noise canceling signal 120 is defined by the processor 28 after the corresponding door-operating event 36 is determined. As discussed above, as the processor 28 determines those portions of the door noise signatures 110 emanating from the door 12 that are unwanted noise 67, the processor 28 determines the noise canceling signal 120 that can be emitted to cancel out the undesirable frequencies of noise emanating from the door 12. Accordingly, only those frequency signatures of the noise from the door 12 that are pleasing are substantially able to reach the ear of the occupant of the vehicle 14. As discussed above, the noise canceling audio signal 38 can also cancel out noise emanating from the vehicle 14 such that the frequencies of unwanted noise 67 can be substantially eliminated for passersby external of the vehicle 14.

Referring again to FIG. 9, to effectuate the noise-canceling function, the micro-electromechanical sensor 40 measures and the processor 28 receives a door noise signature 110 emanating from the door 12 as the door 12 moves to the closed position 34. This door noise signature 110 includes unwanted noises 67 that are to be canceled. The processor 28 evaluates this unwanted noise 67 and delivers a noise canceling signal 120 to the speaker 32 to provide a canceling frequency that is 180° out of phrase of the noise frequency of the unwanted noise 67 to be canceled. As exemplified in FIG. 9, peaks in the door noise signature 110 to be canceled correspond to the valleys in the noise canceling signal 120. The sum of these frequencies results in a net zero sound such that the door noise signature 110, or those portions of the door noise signature 110 outside of the acceptable noise signature 112, are canceled and virtually eliminated such that the occupant of the vehicle 14 does not hear the unwanted noise 67.

Referring again to FIGS. 1-10, it is contemplated that the micro-electromechanical system 10 can include a maintenance state 130 or factory state where certain calibrations can be made to the door 12 of the vehicle 14 during manufacture or repair. In the maintenance state 130, the door 12 can be moved into the closed position 34 where door acceleration measurements are taken. The micro-electromechanical sensor 40 can be used to measure the door acceleration 30 and the processor 28, in turn, can be used to calculate the force 60 necessary to move the door 12 into the closed position 34, the velocity 62 of the door 12 as it moves to the closed position 34, the velocity 62 of the door 12 when closed using an automatic door closer, and other similar velocity-related tolerances. These velocities 62 are typically not constant as the door 12 engages seals, the latch and other components that can at least partially slow the door 12 as it moves into the closed position 34. In the maintenance state 130, the corresponding audio signal 38 can include a calibration signal 100 that communicates to a factory worker, mechanic or other user the status of the door 12 in relation to a particular baseline tolerance. Based upon the calibration signal 100, the user is then able to make modifications to the door 12 or other component proximate the door 12 to place the door 12 within the typical baseline tolerance for that particular vehicle 14.

Referring again to FIGS. 1-10, it is contemplated that during the maintenance state 130, the corresponding door-operating event 36 can be defined by a vertical deflection of the door 12, as the door 12 reaches the closed position 34. In such an embodiment, the micro-electromechanical sensor 40 may typically be in the form of a multi-axis accelerometer 16, such as a three-axis accelerometer 16. This vertical displacement 26 or deflection of the door 12 can be generated through the door 12 being out of alignment at the hinge 150, such that the door 12 is placed at a slight angle relative to the frame 140 surrounding the door 12. When the door 12 is out of alignment, a portion of the door 12 can engage the frame 140 of the vehicle 14 and deflect the door 12 vertically as it moves in the closed position 34. It is also contemplated that a door latch 142 can be slightly out of calibration, such that when the door 12 is moved to the closed position 34, the door latch 142 and door strike 144 do not properly engage. This lack of proper engagement can result in a vertical displacement 26 of the door 12 as the door 12 moves in the closed position 34. As discussed above, this vertical displacement 26 can be measured by the micro-electromechanical sensor 40, such as the three-axis accelerometer 16. This displacement 26 can then be delivered to the processor 28 and communicated as a door-operating event 36 delivered from the processor 28 to the speaker 32. This door-operating event 36 resulting from the vertical displacement 26 can be communicated through the audio file 90 from the speaker 32 in the form of the calibrating signal that may inform the user about how far and in what direction the door 12 needs to be modified in order to be in proper calibration and within the desired baseline tolerances for that particular vehicle 14. In the case of vertical displacement 26, the corresponding audio signal 38 in the form of the calibration signal 100 may be defined by the vertical deflection of the door 12 in relation to a baseline vertical deflection.

According to the various embodiments, the micro-electromechanical sensor 40 can be disposed within various portions of the vehicle door 12 for proper performance of the micro-electromechanical sensor 40. Such locations can include most any position 64 distal from the hinge 150 of a door 12 that extends between the door 12 and the frame 140 of the vehicle 14. Being spaced distal from the hinge 150 of the door 12, the micro-electromechanical sensor 40 can pick up the rotational movement 24 and vertical displacement 26 of the door 12 as it moves between the open and closed positions 50, 34. Typically, the micro-electromechanical sensor 40 will be placed approximately mid-way between the hinge 150 and the opposing edge 152 of the door 12 of the vehicle 14. Because the micro-electromechanical sensor 40 can be made to be extremely small in size, anywhere from approximately 1 micron to approximately 1 mm, the micro-electromechanical sensor 40 can be placed within most any portion of the door 12 of the vehicle 14. In order to properly receive vibrations from the door 12 of the vehicle 14, the micro-electromechanical sensor 40 will typically be placed either on the door frame 140 or an outer panel of the door 12.

According to the various embodiments, the micro-electromechanical sensor 40 can include moving components that move in conjunction with the rotational movement 24 and vertical displacement 26 of the door 12. This movement of the components of the micro-electromechanical sensor 40 is measured in terms of the door acceleration 30. It is contemplated that the micro-electromechanical sensors 40 can be made of various materials that can include, but are not limited to, silicon, polymers, metals, ceramics, combinations thereof and other similar materials. The moving components of the micro-electromechanical sensors 40 can include various mechanisms. These mechanisms can include, but are not limited to, springs, dampers, tensioning devices, piezoelectric mechanisms, Coriolis mechanisms, vibrating mechanisms, gearing mechanisms, pressure sensing mechanisms, combinations thereof, and other similar mechanisms.

Referring now to FIGS. 1-11, having described aspects of the micro-electromechanical system 10, a method 400 is disclosed for operating a speaker 32 for a vehicle 14 using a micro-electromechanical system 10. According to the method 400, a micro-electromechanical sensor 40 is positioned on a portion of a door 12 of the vehicle 14 (step 402). As discussed above, the micro-electromechanical sensor 40 can be disposed on most any portion of a vehicle door 12 and typically distal from the hinge 150 extending between the door 12 and the frame 140 of the vehicle 14. The door 12 is then moved from an open position 50 toward a closed position 34 (step 404). Typically, the micro-electromechanical system 10 will be deactivated once the door 12 is moved from the closed position 34 back to the open position 50. The micro-electromechanical system 10 will then be activated once the door 12 is moved from the open position 50 back toward the closed position 34. Stated another way, when the micro-electromechanical sensor 40 records a negative rotational movement 24 of the door 12 from the closed position 34 toward the open position 50, the micro-electromechanical system 10 can remain inactive. When the door 12 is moved toward the closed position 34 from the open position 50, the micro-electromechanical sensor 40 records a positive rotational acceleration 160 or rotational movement 24 and can activate the micro-electromechanical system 10. It is also contemplated that the micro-electromechanical system 10 can be activated when the door 12 comes to a stop in any of the open positions 50 distal from the closed position 34.

Figure 11:
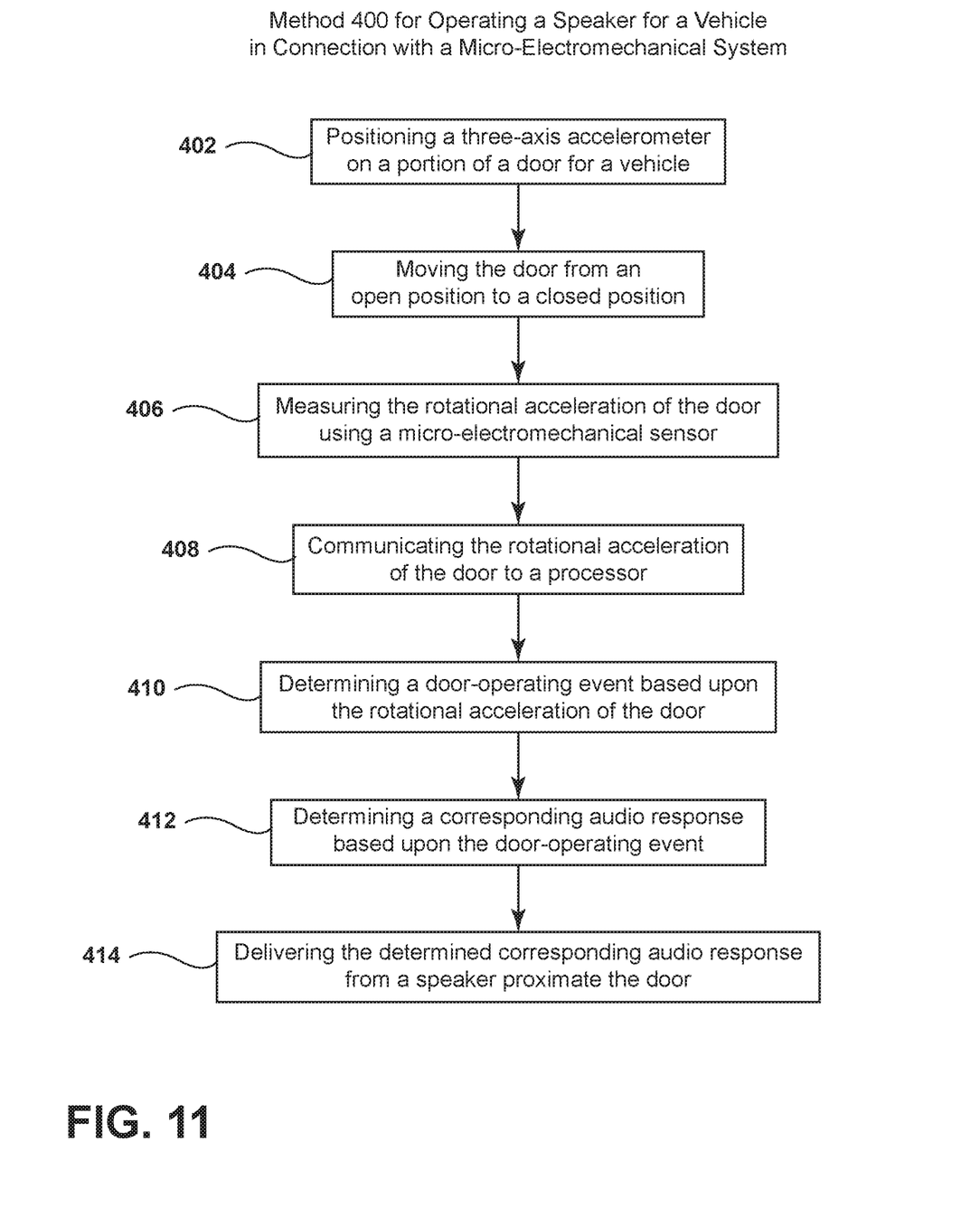
FIG. 11 is a schematic flow diagram illustrating a method for operating a speaker for a vehicle door and using a micro-electromechanical system.
Figure 12:
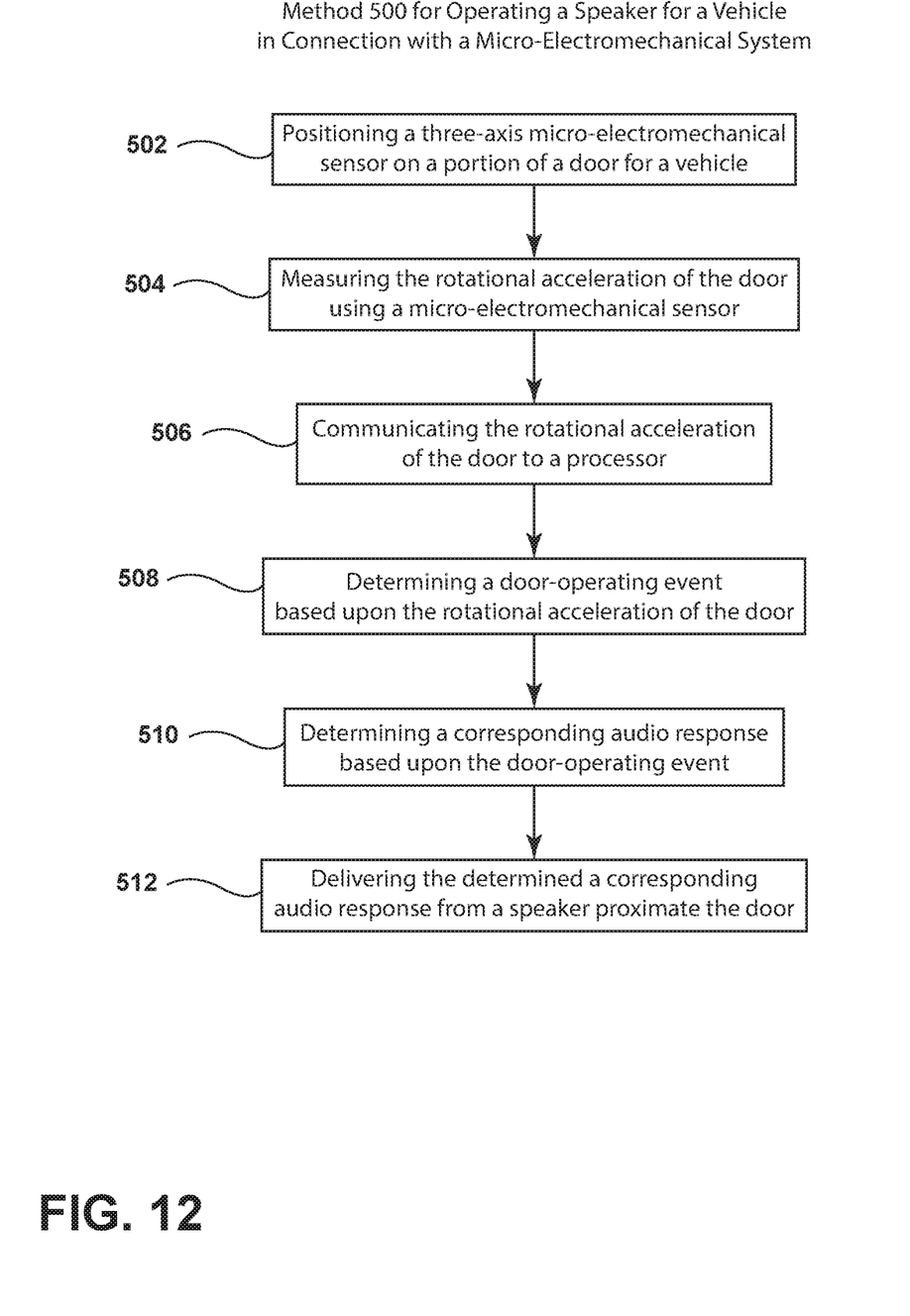
FIG. 12 is a schematic flow diagram illustrating a method for operating a speaker for a vehicle and using a micromechanical system.

According to the method 400, when the door 12 is moved to the closed position 34, the micro-electromechanical sensor 40 measures the rotational acceleration 160 and/or rotational movement 24 of the door 12 (step 406). By way of example, wherein the micro-electromechanical sensor 40 is a three-axis accelerometer 16, this rotational acceleration 160 and/or rotational movement 24 is typically a combination of door movements and/or door accelerations 30 along the x- and y-axis 18, 20 that are combined to form the rotational acceleration 160 and/or rotational movement 24 of the door 12 toward the closed position 34. Any vertical displacement 26 of the door 12 as it moves into the closed position 34 can be measured by the accelerometer 16 in the z-axis 22. The rotational acceleration 160 of the door 12, as well as any vertical acceleration 162 of the door 12 is communicated to the processor 28 by the micro-electromechanical sensor 40 (step 408). The processor 28 then uses the various movements of the door, such as rotational movement 24, rotational acceleration 160 and/or vertical acceleration 162 of the door 12 to determine a door-operating event 36 (step 410). As discussed above, the processor 28 uses the door movement 24 to determine at least one of a door acceleration 30, door position 64, a rotational velocity 62 of the door 12, a vertical displacement 26 of the door 12 and a target resonance 170 of the door 12. The processor 28 then determines a corresponding audio signal 38 for the response (step 412). The processor 28 evaluates the door-operating event 36 and communicates the corresponding audio response 180 to the speaker 32 disposed within or proximate the door 12 of the vehicle 14. The corresponding audio response 180 is then delivered from the speaker 32 (step 414). The speaker 32 emits the audio signal 38 that is indicative of the corresponding audio response 180. As discussed above, the door-operating event 36 can be in the form of a movement of the door 12 toward the closed position 34. In such a condition, the corresponding audio response 180 is a door closing sound that is activated at a predetermined rotational distance from the closed position 34. Again, where the door 12 is moving at a higher velocity 62, the predetermined rotational distance will be greater than where the door 12 is moving at a lesser velocity 62 toward the closed position 34. The timing of the emission of the audio response 180 is matched to the velocity 62 in order to avoid the sound emitted from the speaker 32 being out of phase with the visual of the door closing. Again, the predetermined angular distance 80 from the closed position 34 is determined based at least upon the door position 64 and the rotational velocity 62 of the door 12, where these factors are derived from the rotational movement 24 and/or door acceleration 30 of the door 12 as measured by the micro-electromechanical sensor 40.

Referring now to FIGS. 1-11, where the door-operating event 36 is a door 12 reaching a closed position 34, a door 12 can emit a corresponding target resonance 170. The corresponding target resonance 170 can be in the form of a sound emitted by the door 12 when it enters the closed position 34. As discussed above, this target resonance 170 can be in the form of frequency signatures that are indicative of one or both of acceptable noise signatures 112 and unwanted noises 67 that are delivered from the door 12 into the passenger cabin of the vehicle 14 and also exterior of the vehicle 14. Where the door-operating event 36 is the target resonance 170, the corresponding audio response 180 is a noise-canceling signal that is inversely defined by the corresponding target resonance 170. It is contemplated that the noise canceling signal 120 is defined by the processor 28 after the corresponding door-operating event 36 is determined by the processor 28. In this manner, the noise canceling signal 120 can be 180° out of phase from those frequency signatures that lie outside of the acceptable noise signatures 112 or preferred audio signatures. It is contemplated that the preferred audio signatures can be predetermined and installed within the processor 28 during manufacture or during maintenance of the vehicle 14.

Referring now to FIGS. 1-10 and 12, a method 500 is disclosed for operating a speaker 32 for a vehicle 14 in connection with a micro-electromechanical system 10. According to the method 500, a three-axis micro-electromechanical sensor 40 is positioned on a door 12 of the vehicle 14 (step 502). The rotational acceleration 160 of the door 12 is measured as the door 12 moves into the closed position 34 (step 504). As discussed above, the micro-electromechanical sensor 40, typically in the form of an accelerometer 16 and/or angular rate sensor, measures the rotational acceleration 160 and vertical acceleration 162 of the door 12 as it rotates to the closed position 34 and also deflects vertically as it enters the closed position 34. The rotational acceleration 160 of the door 12 is then communicated by the three-axis micro-electromechanical sensor 40 to the processor 28 (step 506). The processor 28 then determines the door-operating event 36 based upon the door acceleration 30 (step 508). The processor 28 determines a corresponding audio response 180 based upon the door-operating event 36 (step 510). As discussed above, the corresponding audio response 180 can be in the form of a pre-recorded audio file 90, a determined noise canceling signal 120, a calibration signal 100, or other similar audio signal 38 communicated by the speaker 32 of the door 12. In the case of a noise canceling signal 120, the noise canceling signal 120 can also be communicated by a solenoid 118 positioned within the door 12 of the vehicle 14 typically proximate an outer panel of the vehicle 14. Such a solenoid 118 can be used to emanate or deliver a certain frequency of noise that cancels the unwanted noise 67 emanating from the vehicle door 12. Once the corresponding audio response 180 is determined, the corresponding audio response 180 is delivered to the speaker 32, or solenoid 118, where the speaker 32 emits an audio signal 38 indicative of a corresponding audio response 180 (step 512). As discussed above, the processor 28 uses the door acceleration 30 as determined by the three-axis micro-electromechanical sensor 40 to determine at least one of a door position 64, a rotational velocity 62 or speed of the door 12, a vertical deflection of the door 12 and/or a target resonance 170 of the door 12. The processor 28 uses these calculated measurements based upon the door acceleration 30 to determine the door-operating event 36. Such a door-operating event 36 can include, but is not limited to, a movement of the door 12 toward the closed position 34, a movement of the door 12 into the closed position 34 and vertical displacement 26 of the door 12 while moving into the closed position 34.

According to the various embodiments, each door 12 of the vehicle 14 can include a dedicated micro-electromechanical sensor 40. Each of the micro-electromechanical sensors 40 can be placed in communication with one other. In this manner, the position 64 of one particular door 12 can affect the door-operating event 36 and the corresponding audio signal 38 delivered by a speaker 32 of another door 12 in the vehicle 14. It is also contemplated that a micro-electromechanical sensor 40 can be placed on the hood of a vehicle 14, a trunk door 12 of a vehicle 14, or other similar locations that use operable doors 12 for use in various access portions of the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising: a micro-electromechanical sensor attached to a door and in communication with a processor; and
a speaker in communication with the processor; wherein operation of the door toward a closed position is measured by the micro-electromechanical sensor to define a corresponding door acceleration, the processor determines a corresponding door-operating event based on the corresponding door acceleration and the speaker delivers a corresponding audio signal in response to the corresponding door-operating event, wherein the audio is a noise-canceling signal that is inversely defined by a door noise signature of the corresponding door-operating event, wherein the noise-canceling signal is defined by the processor after the corresponding door-operating event is determined; wherein the corresponding door-operating event is a closure of the door.

2. The vehicle of claim 1, wherein the micro-electromechanical sensor is a three-axis accelerometer.

3. The vehicle of claim 2, wherein the corresponding audio signal includes a pre-recorded audio file.

4. The vehicle of claim 3, wherein the pre-recorded audio file is indicative of a door closing sound.

5. The vehicle of claim 2, wherein the processor is operable to define a maintenance state, wherein during the maintenance state, the corresponding door-operating event is defined by a vertical deflection of the door reaching the closed position, wherein the corresponding audio signal during the maintenance state is defined by the vertical deflection of the door in relation to a baseline vertical deflection.

6. The vehicle of claim 5, wherein the vertical deflection is generated by engagement of a door latch of the door with a door strike coupled to a vehicle frame.

7. The vehicle of claim 1, wherein the micro-electromechanical sensor is positioned distal from a hinge of the door, the hinge extending between the door and a vehicle frame.

8. A method for operating a speaker for a vehicle, the method comprising steps of:
positioning a micro-electromechanical sensor on a portion of a door of the vehicle, wherein the micro-electromechanical sensor is a three-axis accelerometer;
operating the door from an open position toward a closed position;
measuring a rotational movement of the door, wherein the micro-electromechanical sensor measures the rotational movement;
communicating the rotational movement of the door to a processor;
determining a corresponding door-operating event, wherein the processor uses the rotational movement of the door to determine at least one of a door position, a rotational speed of the door, a vertical deflection of the door and a target resonance of the door;
determining a corresponding audio response, wherein the processor evaluates the door-operating event and communicates the corresponding audio response to the speaker disposed within the door; and
delivering the corresponding audio response, wherein the speaker emits a corresponding audio signal that is indicative of the corresponding audio response, wherein the processor is operable to define a maintenance state, wherein during the maintenance state, the corresponding door-operating event is defined by the vertical deflection of the door moving into the closed position, wherein the corresponding audio signal during the maintenance state is defined by the vertical deflection of the door in relation to a baseline vertical deflection.

9. The method of claim 8, wherein the three-axis accelerometer is a single sensor that is disposed within an interior cavity of the door distal from a hinge extending between the door and a frame of the vehicle.

10. The method of claim 8, wherein the door-operating event is a movement of the door to the closed position, and wherein the corresponding audio response is a door closing sound that is activated at a predetermined rotational distance distal from the closed position.

11. The method of claim 10, wherein the predetermined rotational distance distal from the closed position is determined based at least upon the door position and rotational speed of the door.

12. The method of claim 8, wherein the corresponding audio response is defined at least by the door position and rotational speed of the door.

13. The method of claim 8, wherein the corresponding audio response is unique for each door-operating event.

14. The method of claim 8, wherein the door-operating event is further defined by the door reaching the closed position, wherein the door reaching the closed position emits a corresponding target resonance of the door, and wherein the corresponding audio response is a noise-canceling signal that is inversely defined by the corresponding target resonance, wherein the noise-canceling signal is defined by the processor after the corresponding door-operating event is determined.

15. The method of claim 8, wherein the audio signal is a calibration signal delivered in response to the vertical deflection.

16. A method for operating a speaker for a vehicle, the method comprising steps of positioning a micro-electromechanical sensor on a vehicle door;
measuring a door acceleration as the vehicle door moves into a closed position;
communicating the door acceleration of the vehicle door to a processor;
determining a corresponding door-operating event based upon the door acceleration;
determining a corresponding audio response based upon the door-operating event; and
delivering the corresponding audio response to the speaker, wherein the speaker emits an audio signal indicative of the corresponding audio response, wherein the corresponding audio signal is a noise-canceling signal that is inversely defined by a door noise signature of the corresponding door-operating event, wherein the noise-cancelling signal is defined after the corresponding door-operating event is determined, wherein the corresponding door-operating event is a closure of the vehicle door.

17. The method of claim 16, wherein the processor uses the door acceleration to determine at least one of a door position, a rotational speed of the door, a vertical deflection of the door and a target resonance of the door, and wherein the door-operating event includes at least one of movement of the door toward the closed position, movement of the door into the closed position and vertical displacement of the door while moving into the closed position.

18. The method of claim 16, wherein the noise-canceling signal is defined by the processor after the corresponding door-operating event is determined.

19. The method of claim 18, wherein the micro-electromechanical sensor is a three-axis accelerometer.

* * * * *

UNITED STATES PATENT AND TRADEMARK OFFICE
CERTIFICATE OF CORRECTION

PATENT NO. : 10,023,010 B2
APPLICATION NO. : 15/377150
DATED : July 17, 2018
INVENTOR(S) : Newton et al.

Page 1 of 1

It is certified that error appears in the above-identified patent and that said Letters Patent is hereby corrected as shown below:

In the Claims

Column 11:
Claim 1, Line 5;
After "audio" insert --signal--.

Signed and Sealed this
Eighteenth Day of September, 2018

Andrei Iancu
*Director of the United States Patent and Trademark Office*